United States Patent [19]

Nelissen et al.

[11] Patent Number: 5,071,922

[45] Date of Patent: Dec. 10, 1991

[54] PROCESS FOR PREPARATION OF MODIFIED POLYPHENYLENE ETHER OR RELATED POLYMERS AND THE USE THEREOF IN MODIFIED HIGH TEMPERATURE RIGID POLYMER OF VINYL SUBSTITUTED AROMATICS

[75] Inventors: Laurentius N. I. H. Nelissen, Eindhoven; Johannes M. Zijderveld, Breda, both of Netherlands

[73] Assignee: Shell International Research Maatschappij B.V., The Hague, Netherlands

[21] Appl. No.: 377,433

[22] Filed: Jul. 6, 1989

[30] Foreign Application Priority Data

Jul. 7, 1988 [GB] United Kingdom ............... 8816197
Apr. 11, 1989 [GB] United Kingdom ............... 8908080

[51] Int. Cl.$^5$ .................. C08F 283/08; C08F 71/12
[52] U.S. Cl. ................... 525/392; 525/68; 525/92; 525/397; 525/905
[58] Field of Search ............ 525/68, 92, 392, 397, 525/905

[56] References Cited

U.S. PATENT DOCUMENTS

| | | | |
|---|---|---|---|
| 3,402,143 | 9/1968 | Hay | 525/397 |
| 3,487,127 | 12/1969 | Erchak | 525/69 |
| 3,862,263 | 1/1975 | Maruta | 525/68 |
| 4,048,143 | 9/1977 | Hay | 525/397 |
| 4,156,773 | 5/1979 | Loucks | 528/214 |
| 4,165,422 | 8/1979 | White | 525/397 |
| 4,189,417 | 2/1980 | Goosens | 524/776 |
| 4,287,321 | 9/1981 | Olander | 525/392 |
| 4,614,616 | 9/1986 | Petzoldt | 540/4 |
| 4,743,661 | 5/1988 | Mitulla | 525/396 |
| 4,797,453 | 1/1989 | Taubitz | 525/397 |

FOREIGN PATENT DOCUMENTS

| | | |
|---|---|---|
| 25200 | 3/1981 | European Pat. Off. . |
| 261574 | 3/1988 | European Pat. Off. . |
| 264623 | 4/1988 | European Pat. Off. . |
| 3238930 | 4/1984 | Fed. Rep. of Germany . |
| 42-022069 | 10/1967 | Japan . |
| 49-002343 | 1/1974 | Japan . |
| 49-020379 | 5/1974 | Japan . |
| 63-079897 | 4/1988 | Japan . |
| 83 02117 | 3/1976 | PCT Int'l Appl. . |
| 979369 | 12/1982 | U.S.S.R. . |
| 1202775 | 8/1970 | United Kingdom . |

*Primary Examiner*—Jacob Ziegler

[57] ABSTRACT

Process for the manufacture of modified polyphenylene ether or structurally related polymers comprising:

the reaction of polyphenylene ether or structurally related polymer with a non-cyclic acid anhydride, in the presence of a pyridine derivative substituted by an amine group as catalyst, and in a vinyl substituted aromatic monomer as solvent;

modified polyphenylene ethers so obtained and use of them for the manufacture of modified high temperature rigid poly (vinyl substituted aromatic) polymer compositions.

2 Claims, 1 Drawing Sheet

PROCESS FOR PREPARATION OF MODIFIED POLYPHENYLENE ETHER OR RELATED POLYMERS AND THE USE THEREOF IN MODIFIED HIGH TEMPERATURE RIGID POLYMER OF VINYL SUBSTITUTED AROMATICS

The invention relates to a process for the preparation of modified polyphenylene ether or related polymers and to the use thereof in modified high temperature rigid polymers of vinyl substituted aromatics. More particularly the invention relates to an improved process for the preparation of modified polyphenylene ether or structurally related polymers by capping the residual free hydroxy groups in such compounds by reaction with an acid derivative.

Blends of polymers of vinyl substituted aromatics and poly(2,6-dimethyl-1,4-phenylene ether), furtheron to be indicated by PPE, or structurally related polymers and more particularly blends of polystyrene and PPE have been aimed at for a long time.

However, the polymerization of vinyl substituted aromatics in the presence of PPE was found to be prohibited or inhibited, which causes lower polymerization yields of the vinyl substituted aromatic monomer and more particularly when the PPE is used in a large amount there are some cases where the polymerization does not progress at all. Accordingly, no substantial polymerization could be progressed unless the PPE was used in an amount as small as possible to make the concentration of the vinyl substituted aromatic compound higher.

This phenomenon was especially observed in the case where a vinyl substituted aromatic, and more particularly styrene, was polymerized in an aqueous dispersion in the presence of PPE and optionally a rubber component. Several processes were proposed in the past such as those described in Japanese patent application No. 22069/67; Dutch patent application No. 6617529; French patent No. 1,551,503, using large excesses of styrene as to the PPE.

A common feature of all these processes was that in order to decrease the styrene content of the polymerization product, it was necessary to lower polymerization yield. In the case of polymerization of e.g. styrene in a suspension system there was observed a phenomenon, that even if the styrene content of the polymerization is intended to be decreased by lowering the polymerization yield, a large amount of unreacted styrene remains in the polymerization product.

The unreacted monomer relatively high in boiling point, which was contained in such beads, was found to be difficultly removed by drying, with the result that a moulded article obtained from the polymerization product was greatly injured in appearance and was also deteriorated in physical properties.

In order to avoid these disadvantages, several remedies were proposed in the past such as described in e.g. U.S. Pat. No. 3,862,263, proposing a process, in which a relatively small amount of a styrene compound is substantially completely graft polymerized on PPE, optionally mixed with an elastomeric polymer, and as described in U.S. Pat. No. 4,287,321 disclosing the preparation of PPE-poly(vinyl aromatic) compositions by oxidatively coupling a phenol dissolved in a basic reaction medium, comprising a vinyl aromatic compound in the presence of a manganese chelate catalyst, selectively extracting base-reactive by-products, and then thermally polymerizing the vinyl aromatic compound.

As another remedy to avoid the hereinbefore described difficulties, processes were proposed for capping the starting PPE by conversion of the remaining free hydroxyl groups in said PPE with a material capable of reacting therewith to form inert substituents in a mutual solvent such as aromatic solvents like toluene, benzene.

Typical examples of such capping agents include acid halides, acid anhydrides or ketenes as disclosed in e.g. European patent applications Nos. 0261574 and 0264623 and U.S. Pat. Nos. 4,048,143; 4,189,417; 4,156,773; and 4,165,422.

Although this capping process was known in principle for some time, a rather extensive research for improved and more economical embodiments has still continued, an important part of the efforts being directed to the application of improved alternative capping agents, as appears e.g. from German patent application No. 3238930, U.S. Pat. No. 4,743,661 and the International patent application WO 83/02117.

Although some of the hereinbefore described processes could indeed provide some progress in the art, there remained a strong need for polymer blends which are obtainable by an economically attractive process for polymerization of a vinyl substituted aromatic monomer in the presence of relatively large amounts of PPE, to be incorporated in the final polymer blends, showing the desired improved characteristics such as high temperature rigidity, and more particularly final polymer blends representing interpenetrating networks.

More particularly there is still a need for an economical manufacturing process for the preparation of modified PPE, which can successfully be applied for the manufacture of blends of polymer of vinyl substituted aromatic monomers and said modified PPE in order to get modified high temperature rigid compositions aimed at. With the term "modified high temperature rigid compositions" as used throughout the present specification are meant compositions, which show a higher glass transition temperature (Tg) as compared with conventional compositions and as a consequence a higher Vicat softening point e.g. measured according to Vicat B DIN 53460.

As a result of extensive research and experimentation there was now surprisingly found a process for the manufacture of modified polyphenylene ether or structurally related polymers, comprising the reaction of a compound of the formula:

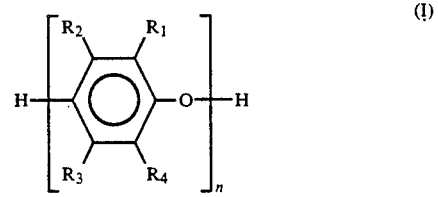

(I)

wherein $R_1$, $R_2$, $R_3$ and $R_4$ are independently a hydrogen atom, a halogen atom or an alkyl group or an alkoxy group, both being optionally substituted by halogen, cyano, hydroxy or phenyl group, and having 12 or less carbon atoms, an aryloxy or arylalkoxy group, optionally substituted by halogen, hydroxy or cyano group and having 12 or less carbon atoms, a di(alkyl)amino group or a di(alkanoyl)amido group, wherein the alkyl groups have 12 or less carbon atoms, and wherein $R_1$, $R_2$, $R_3$ and $R_4$ may represent different or the same groups in one repeating unit, and n represents an integer having a value of at least 50 and more preferably 100 to 500, with a non-cyclic acid anhydride of the general formula:

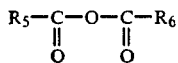     (II)

wherein $R_5$ and $R_6$ each independently may represent an alkyl, alkenyl, aryl (preferably phenyl) or aralkyl (preferably aryl lower alkyl) group, containing from 1 to 12 carbon atoms and optionally being substituted by hydroxy, halogen and preferably bromine, alkyl containing 1-4 carbon atoms, or a free or esterified carboxyl group, in the presence of a catalyst of the formula:

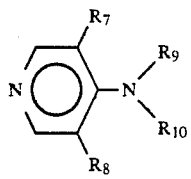     (III)

wherein $R_9$ and $R_{10}$ both represent in general non-electron withdrawing groups such as alkyl groups containing from 1 to 4 carbon atoms, optionally substituted by at most one phenyl group and wherein the symbols $R_7$ and $R_8$ represent hydrogen, halogen or lower alkyl, while $R_9$ and $R_{10}$ may represent different or the same groups in one molecule, and in a vinyl substituted aromatic monomer as solvent.

According to preferred embodiments of this process of the present invention the symbols $R_1$, $R_2$, $R_3$ and $R_4$ in formula I are selected from hydrogen or an alkyl containing from 1 to 4 carbon atoms and more preferably from hydrogen and methyl. Most preferably $R_1$ and $R_4$ both represent methyl and $R_2$ and $R_3$ both represent hydrogen.

Typical examples of the polyphenylene ether or structurally related polymers to be applied for the process of the present invention, include poly-2,6-dimethyl-1,4-phenylene ether; poly-2,6-diethyl-1,4-phenylene ether; poly-2,6-dipropyl-1,4-phenylene ether; poly-2-methyl-6-allyl-1,4-phenylene ether; poly-ditert-butyl-dimethoxy-1,4-phenylene ether; poly-2,6-dichloromethyl-1,4-phenylene ether, poly-2,6-dibromomethyl-1,4-phenylene ether; poly-2,6-di(2-chloroethyl)-1,4-phenylene ether; poly-2,6-ditolyl-1,4-phenylene ether; poly-2,6-dichloro-1,4-phenylene ether; poly-2,6-diphenyl-1,4-phenylene ether and poly-2,5-dimethyl-1,4-phenylene ether.

Preferred examples of compounds of the formula II, are those wherein $R_5$ and $R_6$ represent the same group. More preferably acetic anhydride, benzoic anhydride, bromoacetic anhydride, fumaric acid anhydride and the like are used and most preferably acetic anhydride or bromoacetic anhydride is used.

In the catalyst according to formula III, the symbols $R_9$ and $R_{10}$ preferably represent both methyl groups or ethyl groups, whereas $R_7$ and $R_8$ preferably represent hydrogen, chlorine or methyl. Most preferably N,N-dimethyl-4-amino pyridine (DMAP) is used as catalyst.

It will be appreciated that in the vinyl substituted aromatic monomer optionally one or more elastomeric homopolymers or copolymers may be included. More particularly homopolymers or copolymers of a vinyl substituted aromatic monomer and a conjugated diene monomer may be included. More particularly block copolymers AB or ABA comprising a block of vinyl-substituted aromatic monomer (A) and a block of conjugated diene (B) such as polystyrene and polybutadiene or polyisoprene blocks may be used. More preferably partially hydrogenated and/or modified block copolymers of a vinyl-substituted aromatic monomer and conjugated diene may be included.

Suitable examples of elastomeric polymers may be selected from polybutadiene, polyisoprene (including natural rubber), polychloroprene, butadiene-styrene random or block copolymers, prepared by emulsion or solution polymerization, polyisoprene-styrene random or block copolymers. Such included copolymer may improve the impact strength.

The vinyl substituted aromatic monomer may be selected from the group consisting of styrene, alphamethylstyrene, 2,4-dichlorostyrene, p-methoxystyrene, p-nitrostyrene, p-methylstyrene, 3,4-dimethylstyrene, m-tert-butylstyrene, p-dodecylstyrene, p-phenylstyrene, p-acetoxystyrene, divinylbenzene, p-aminostyrene, p-(chloromethyl)-styrene, m-cyanostyrene, o-hydroxystyrene, p-vinylbenzoic acid, alpha-propylstyrene, alpha-undecylstyrene, o-methyl-alpha-methylstyrene, m-methyl-alpha-methylstyrene, p-methyl-alpha-methylstyrene, p-methoxy-alpha-methylstyrene, p-cyano-alphamethylstyrene, m-bromo-alpha-methylstyrene, p-chloroalpha-methylstyrene and 1,1-diphenylethylene or mixtures thereof of which styrene alone or predominantly styrene containing monomer mixtures being preferred.

It will be appreciated that in the event that $R_1$, $R_2$, $R_3$ or $R_4$ represents a substituent containing a hydroxyl group, a corresponding excess amount of the non-cyclic acid anhydride is used.

The vinyl substituted aromatic monomer itself and more preferably styrene, or mixtures of them is used as solvent for the preparation of the modified PPE or structurally related polymer. During this conversion a reaction temperature is applied in the range of from 0° to 60° C. and more preferably from 10° to 30° C.

According to a preferred embodiment of the process of the present invention for preparation of capped PPE or structurally related polymer, an amount of 5-50% by weight of e.g. unmodified PPE calculated on the weight of the complete reaction mixture, is converted.

However, in principle higher concentrations of unmodified PPE or structurally related polymer may be converted too, whereafter the obtained reaction mixture may be diluted with additional vinyl substituted aromatic monomer to the desired concentration of PPE, before starting the polymerization process.

On the other hand, one can also prepare low concentration PPE solutions in vinyl substituted aromatic monomer and remove a part of this monomer by evaporation to obtain the desired concentration of PPE.

More preferably unmodified PPE or a structurally related polymer is used in the starting mixture in a concentration of 30-50% by weight.

With the term "unmodified PPE or structurally related polymers", as used throughout the present specification, are meant polymers, having terminal free hydroxy groups.

During the conversion of unmodified PPE or structurally related polymer, the catalyst may be used in a concentration in the starting reaction mixture of from 0.0025–0.1% by weight and preferably of from 0.01 to 0.075% by weight, calculated on the weight of the complete reaction mixture.

The non-cyclic acid anhydride according to formula II may be used in a concentration in the starting reaction solution, e.g. in styrene, of from 0.05 to 0.5% by weight and more preferably from 0.1 to 0.3% by weight, calculated on the weight of the complete reaction mixture.

It will be appreciated that according to the present conversion process of unmodified PPE or structurally related polymer, bearing terminal free hydroxy groups, modified PPE or structurally related polymer is quickly and efficiently obtained as compared with prior art processes. The product shows characteristic infrared absorption maxima, from which the characteristic maxima which normally may be attributed to the presence of any free hydroxy group, have disappeared to a substantially neglectable level, whereas the other characteristic maxima, originally found for the starting PPE, being not attributable to hydroxy groups, have remained. Moreover, a novel characteristic Fourier transformed infrared absorption maximum is found at about 1765 cm$^{-1}$, e.g. as shown in FIG. 1 for PPE converted with acetic anhydride, isolated by precipitation in methanol, showing a maximum at 1764.98 cm$^{-1}$, as compared with normal PPE.

It will be appreciated that another aspect of the present invention is formed by the use of the modified PPE or a structurally related polymer for the manufacture of modified, high temperature rigid polymers of vinyl substituted aromatics by means of several polymerization methods, dependent on the finally desired application of said compositions.

Accordingly the present invention is also relating to a process for the manufacture of heat stable modified poly(vinyl substituted aromatic) compositions, comprising the polymerization of a vinyl substituted aromatic monomer in the presence of a modified polyphenylene ether or a structurally related polymer, obtainable by reaction of a compound of the formula:

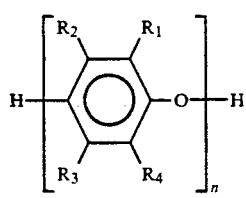

wherein $R_1$, $R_2$, $R_3$ and $R_4$ are as defined hereinbefore, with a compound of the formula:

wherein $R_5$ and $R_6$ are as defined hereinbefore in the presence of a catalyst of the formula:

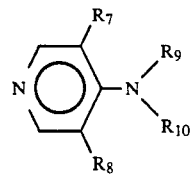

wherein $R_7$, $R_8$, $R_9$ and $R_{10}$ are as defined hereinbefore and in a vinyl substituted aromatic monomer as solvent.

It will be appreciated by persons skilled in the art that such a process enables an economically very attractive manufacture of the desired vinyl substituted aromatic polymers, modified by the incorporation of PPE or a structurally related polymer.

For example beads of modified polymers of vinyl substituted aromatics may be prepared by aqueous suspension polymerization. Such beads may be optionally impregnated by a physically and/or chemically blowing agent during or after the polymerization process. Such beads may be applied for e.g. injection moulding, extrusion etc., to prepare a great variety of engineering plastics when non-impregnated beads are used, and may be applied in impregnated expandable forms to prepare a great variety of engineering foams.

It will be appreciated that the polymerization of the vinyl substituted aromatic monomer, containing the modified (capped) PPE or structurally related polymer may also be carried out as bulk polymerization, optionally in the presence of usual auxiliaries, such as fillers, fibres or non-woven webs, dyes, stabilizers or flame retardants, to form shaped articles.

Especially the manufacture of thermoplastic matrix polymer compositions, having a specifically desired shape, was not possible up to now. Therefore, it is an unexpected advantage of the process of the present invention that such shaped thermoplastic matrix polymers are provided now.

It was found that the modified PPE or structurally related polymer could be incorporated in situ into the polymer compositions to be formed during polymerization of the vinyl substituted aromatic in a sufficiently effective amount and in an economically attractive way. More particularly the modified PPE or structurally related polymer could be incorporated in an economically attractive way, into beads of polymers of the vinyl substituted aromatics and more preferably styrene, which are formed during aqueous suspension polymerization of such monomers.

With the term "in a sufficiently effective amount" as used throughout the present specification, is meant to indicate that the modified PPE or structurally related polymer can be incorporated in situ during the preparation of these matrixpolymer blend beads of the polymer of vinyl substituted aromatic to provide to them the desired heat stability. For example increase of Tg of the final beads of about 40° C. as compared with beads substantially free of PPE or structurally related polymer, when containing an amount of about 40% by weight of PPE or structurally related polymer, calculated on the weight of the final matrixpolymer blend composition.

Preferably the modified PPE or structurally related polymer, and more preferably PPE, obtained according to hereinbefore specified conversion, is subsequently used for incorporation into matrixpolymer blend beads, to be formed by means of aqueous suspension polymerization to be carried out by methods known in principle.

The polymerization process may be carried out in any suitable reactor equipped with heating means and agitating means. The reaction mixture, obtained by the conversion of unmodified PPE or structurally related polymer, is heated for a period of time and a temperature to cause the vinyl substituted aromatic monomer to polymerize. Generally temperatures of from 80° C.–175° C. may be employed and preferably in the range of from 90° to 130° C. for a period of 2 to 10 hours. If temperatures above the boiling point of vinyl substituted aromatic monomer are used or if blowing agents have to be impregnated during polymerization pressure vessels should be used to prevent vaporization.

According to a preferred embodiment of the aqueous suspension polymerization, the amount of water may vary from 1 to 10 parts by weight, per part by weight of the reaction mixture containing the modified PPE or structurally related polymer and vinyl substituted aromatic monomer(s) and preferably from 1 to 2 parts water per part by weight of the reaction mixture. The aqueous dispersion to be used may optionally contain a dispersion stabilizer and one or more polymerization catalysts.

Examples of such dispersion stabilizers include polyvinyl alcohol, gelatine, agar, starch, glycerine, sodium salt of polyacrylic acid and polymethacrylic acid, polyethylene glycol, hydroxyethyl cellulose, carboxymethyl cellulose, methyl cellulose, ethylene glycol, polyacrylamide and 1:1 copolymer of e.g. styrene and maleic anhydride. The amount of the dispersion stabilizer to be used is ordinarily from 0.0001 to 3% by weight and preferably from 0.001 to 1.5% by weight and more preferably 0.01 to 0.7% by weight, based on the weight of the water used.

Typical examples of the polymerization catalysts include decanoyl peroxide; benzoyl peroxide; lauryl peroxide; octanoyl peroxide; stearyl peroxide; 3,5,5-trimethyl hexanoyl peroxide; tert-butyl perbenzoate; tert-butyl peracetate; tert-butyl perpivalate; diisopropylbenzene hydroperoxide; 2,5-dimethyl-2,5-di-tert-butyl peroxyhexane; di-tert-butyl peroxide; cyclohexanone peroxide; dicumyl peroxide; alpha,alpha'-azobisisobutyronitrile, tert-butyl peroxyisobutyrate and tert-butyl peroxylaurate.

These radical initiators are preferably high temperature decomposing type catalysts or are used in the form of a combination of 2 or more catalysts, e.g. a combination of a low temperature decomposing type catalyst with a high temperature decomposing type catalyst. In case the combination of a low temperature decomposition type catalyst with a high temperature decomposing type catalyst is used, the polymerization is effected initially at below about 90° C. and, after a certain extent of polymerization yield has been attained, the temperature of the system is elevated to carry out the polymerization substantially completely at a high temperature.

Preferred combinations of the catalysts used include combinations of lauroyl peroxide with dicumyl peroxide; lauroyl peroxide with di-tert-butyl peroxide; lauroyl peroxide with tert-butyl peroxybenzoate; lauroyl peroxide with 2,5-dimethyl-2,5-di-tert-butyl peroxyhexane; lauroyl peroxide with benzoyl peroxide; 3,5,5-trimethylhexanoyl peroxide with dicumyl peroxide; 3,5,5-trimethylhexanoyl peroxide with tert-butyl peroxybenzoate; 3,5,5-trimethylhexanoyl peroxide with benzoyl peroxide; 3,5,5-trimethylhexanoyl peroxide with di-tert-butyl peroxide; tert-butyl peroxypivalate with di-tert-butyl peroxide; tert-butyl peroxypivalate with dicumyl peroxide; tert-butyl peroxypivalate with tert-butyl peroxybenzoate; 2,4-dichlorobenzoyl peroxide with tert-butyl peroxybenzoate; 2,4-dichlorobenzoyl peroxide with dicumyl peroxide; 2,4-dichlorobenzoyl peroxide with di-tert-butyl peroxide; 2,4-dichlorobenzoyl peroxide with 2,5-dimethyl-2,5-di-tert-butyl hexane; octanoyl peroxide with dicumyl peroxide, octanoyl peroxide with di-tert-butyl peroxide, and benzoylperoxide with di-tert-butylperoxybenzoate.

In the present invention, the polymerization catalyst may be used in an amount suitable for polymerization of the vinyl substituted aromatic compound. For adequate practice of the present invention, the catalyst is used in an amount of 0.01 to 1% by weight, preferably 0.3 to 0.7% by weight, based on the weight of the fed monomers.

The obtained modified poly(vinyl substituted aromatic) and more preferably polystyrene beads, containing the modified PPE or structurally related polymer, may be impregnated with a blowing agent to provide the desired expandable beads of modified polymer of vinyl substituted aromatic during or after polymerization.

The invention is further illustrated by the following examples, however without restriction of its scope to these specific embodiments.

EXAMPLE 1

Figure 1:
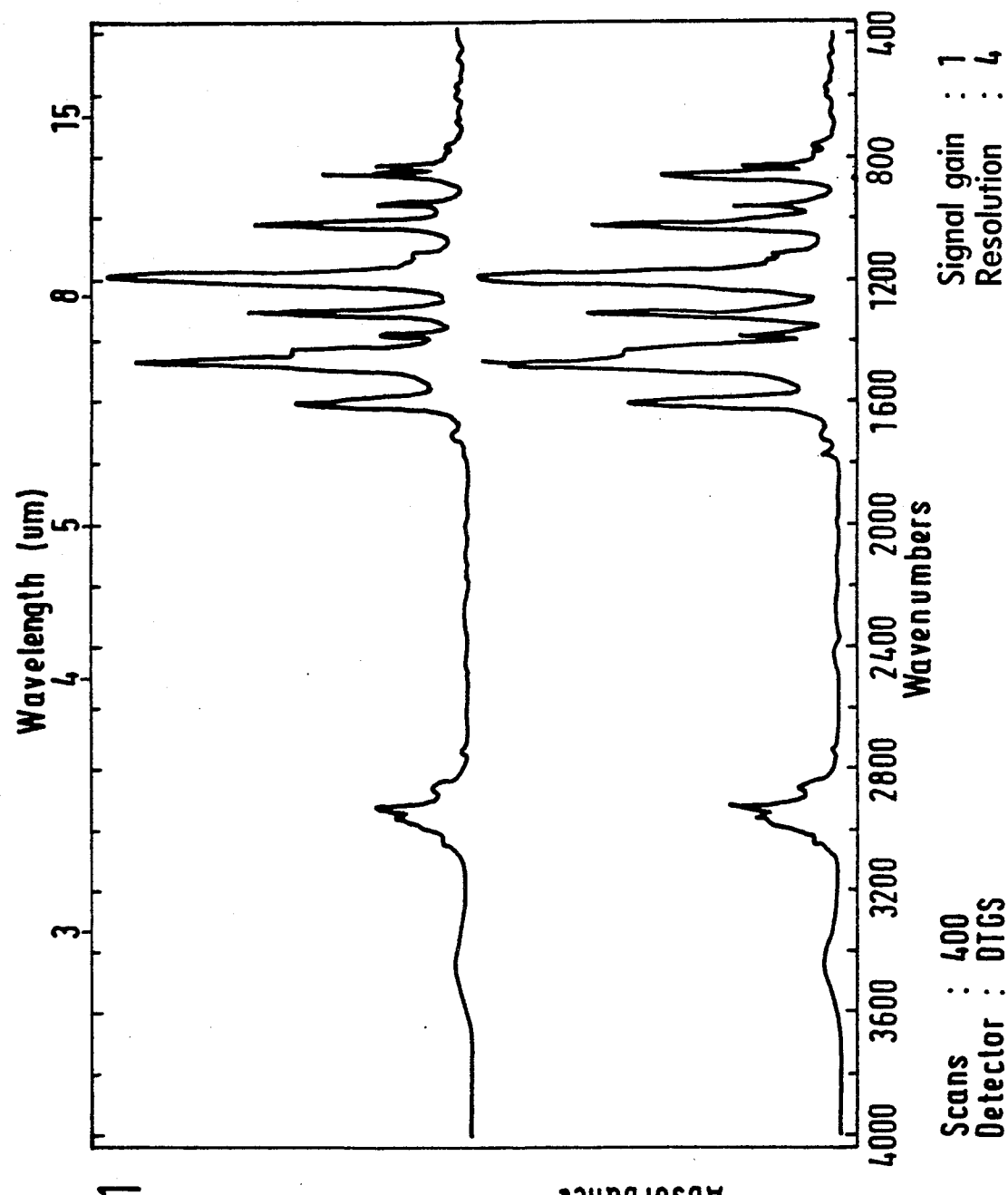
FIG. 1 shows infrared adsorption spectrum as measured in Example 1.

Several polyphenylene ethers (mol. weight in the range from Mn 20,000 to Mn 30,000) were dissolved in styrene in about 1 hr at room temperature, in an amount of 30% by weight, based on the weight of the total composition. Subsequently acetic anhydride and N,N-dimethyl-4-aminopyridine (DMAP) were added in amounts of 0.1% by weight and 0.01% by weight respectively, calculated on the weight of total reaction mixture. After 1 hr stirring at room temperature a small sample of the reaction mixture was precipitated in methanol at room temperature and an infrared absorption spectrum was measured as depicted in FIG. 1, showing a characteristic absorption maximum at 1764.98 cm$^{-1}$. Hereafter the temperature was increased to 70° C. and water, containing 0.2% by weight of Natrosol 250 G (Registered Trademark) (I.V.=350 mPa/sec, 2% aqueous solution measured at 25° C.) of 70° C. was added.

Thereafter the obtained suspension was heated to 93° C. and radical polymerized during 5 hours in the presence of dibenzoylperoxide (DBPO), followed by subsequent reaction during three hours at 110° C.–120° C. in the presence of tert-butylperoxybenzoate (TBPB).

Regular spherical beads were obtained, showing a Tg of about 135° C. These obtained beads were subsequently impregnated with a blowing agent.

EXAMPLE 2

Several polyphenylene ethers [poly(2,6-dimethyl-1,4-phenylene) ether] having a number average molecular weight Mn in the range of from 20,000 to 30,000 were dissolved in styrene at room temperature to provide a 10% by weight solution and acetic anhydride and DMAP were added in amounts to give concentrations of 0.2% by weight and 0.05% by weight respectively (calculated on the weight of the total reaction system). After stirring for one hour at room temperature the solution was heated to 130° C. and prepolymerized for 1 hr.

The solution was then suspended in water containing 0.2% by weight Natrosol 250 G polymerized in the usual way.

This resulted in spherically round beads with a Tg of ±110° C.

An identical experiment was carried out, using 20% by weight of PPE, except for the pre-polymerization step. After heating to 130° C. the solution was suspended, resulting also in transparent beads with a Tg of ±120° C.

EXAMPLE 3

Polyphenylene ether (Mn=25,000) was dissolved in styrene at room temperature to provide a 40% by weight solution and acetic anhydride and DMAP were added in amounts to give concentrations of 0.4% by weight and 0.11% by weight respectively calculated on the weight of total reaction mixture.

After 1 hr stirring at room temperature a woven fabric (Keflar 49, Registered Trademark) was added. Thereafter this sample was heated to 140° C. and polymerized thermally. The matrix of the resulting composite has a Tg of ±140° C.

EXAMPLE 4

In the same way as described in Example 2 polyphenylene ethers dissolved in styrene were converted with benzoic anhydride and DMAP, followed by suspension polymerization in water containing 0.2% by weight Natrosol 250 G, resulting in spherically round beads with a Tg of ±110° C.

EXAMPLE 5

The same experiment of Example 2 was repeated using bromoacetic anhydride and DMAP, followed by suspension polymerization in water containing 0.4% by weight tricalciumphosphate resulting in spherically round beads with a Tg of ±110° C.

We claim:
1. The process of incorporating a modified polyphenylene ether into a poly (vinyl substituted aromatic) polymer by means of aqueous polymerization comprising the free radical polymerization of a vinyl substituted aromatic monomer in the presence of the modified polyphenylene ether, obtained by a previous reaction of a compound of the formula:

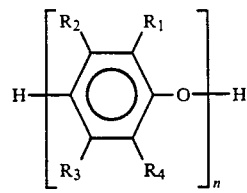

wherein $R_1$, $R_2$, $R_3$ and $R_4$ are independently a hydrogen atom, a halogen atom or an alkyl group or an alkoxy group, both being optionally substituted by halogen, cyano, hydroxy or phenyl group, and having 12 or less carbon atoms, an aryloxy or arylalkoxy group, optionally substituted by halogen, hydroxy or cyano group and having 12 or less carbon atoms, a di(alkyl)amino group or a di(alkanoyl)amido group, wherein the alkyl groups have 12 or less carbon atoms, and wherein $R_1$, $R_2$, $R_3$ and $R_4$ may represent different or the same groups in one repeating unit, and n represents an integer having a value of at least 50, with a non-cyclic acid anhydride of the general formula:

wherein $R_5$ and $R_6$ each independently may represent an alkyl, alkenyl, aryl or aralkyl group, containing from 1 to 12 carbon atoms and optionally being substituted by hydroxy, halogen, alkyl containing 1–4 carbon atoms, or a free or esterified carboxyl group, in the presence of a catalyst of the formula:

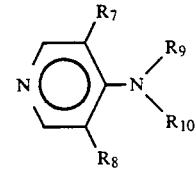

wherein $R_9$ and $R_{10}$ both represent in general non-electron withdrawing groups and wherein the symbols $R_7$ and $R_8$ represent hydrogen, halogen or lower alkyl, while $R_7$, $R_8$, $R_9$ and $R_{10}$ may represent different or the same groups in one molecule, and in a vinyl substituted aromatic monomer as solvent.

2. Product obtained by the process of claim 1.

* * * * *